March 16, 1965 L. C. BERZINSKI, JR., ETAL 3,174,102

SIGNAL MUTING CIRCUIT FOR DATA TRANSMISSION SYSTEMS

Filed May 31, 1962

*INVENTOR*
LEO C. BERZINSKI JR.
RONALD J. BYMERS
CARL E. RUOFF

BY John C Black
*ATTORNEY*

United States Patent Office 3,174,102

Patented Mar. 16, 1965

3,174,102

SIGNAL MUTING CIRCUIT FOR DATA TRANSMISSION SYSTEMS

Leo C. Berzinski, Jr., Endicott, Ronald J. Bymers, Vestal, and Carl E. Ruoff, Endwell, N.Y., assignors to International Business Machines Corporation, New York, N.Y., a corporation of New York Filed May 31, 1962, Ser. No. 198,979

6 Claims. (Cl. 325—52)

Figure 1:
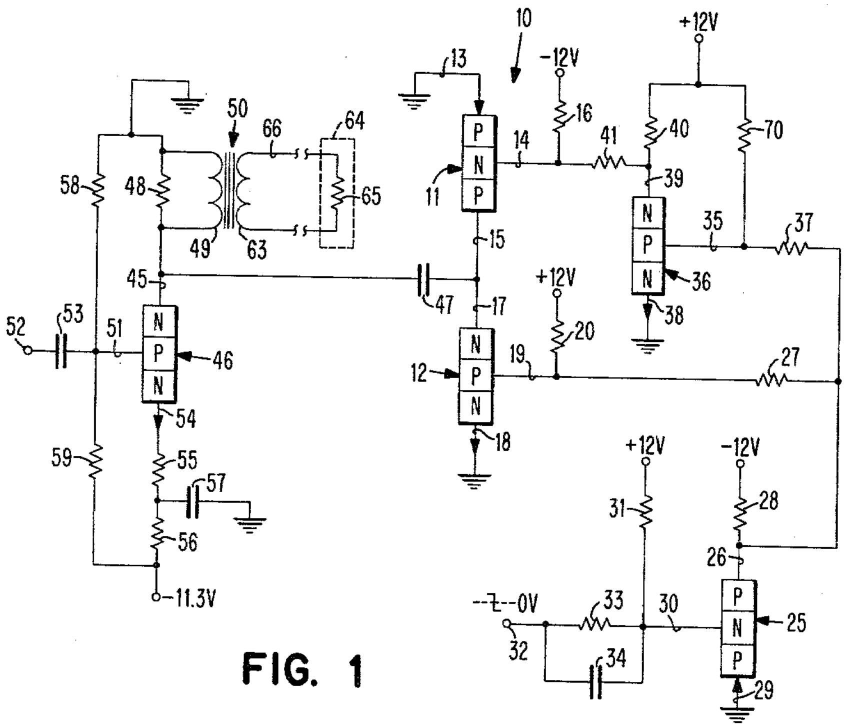

This invention relates generally to an improved circuit for preventing variations in the voltage at a desired point in electrical apparatus and more particularly but not exclusively to an improved circuit for preventing an audio signal from being impressed upon a telephone line.

In certain telephone applications, there is a need for muting an audio signal without introducing into transmission line a D.C. voltage shift or transient. In known circuits where the muting circuit is gated on and off, substantial transients are introduced into the telephone line in response to the gating signals. For example, in a telephone answering service in which messages are prerecorded in a suitable manner and in which the composition of the message to be transmitted is achieved by selection of prerecorded portions of the message from different recording channels, high noise transients are produced in switching from channel to channel for composition of the message. It is during these switching periods that it is desirable to mute audio signals on the transmission line to prevent undesirable noise at the receiver.

It is therefore a primary object of the present invention to provide an improved muting circuit.

It is another object of the present invention to provide a gated muting circuit which does not produce transient noise in a transmission line in response to gating on and off of the muting circuit.

It is another important object of the present invention to provide an improved muting circuit for use in the interrogation and selection of message transmission lines.

It is another object of the present invention to provide an improved muting circuit for gating serially received information bits in a message transmission system.

The above objects are achieved in a preferred embodiment of the invention by providing a pair of complementary transistors which are biased to a condition of heavy saturation when muting is desired. A capacitor connected directly between the collectors of the two transistors and the audio signal terminal of the transmission system shorts the audio signals through the collector-emitter terminals to ground potential.

The foregoing and other objects, features and advantages of the invention will be apparent from the following more particular description of preferred embodiments of the invention, as illustrated in the accompanying drawings.

Figure 2:
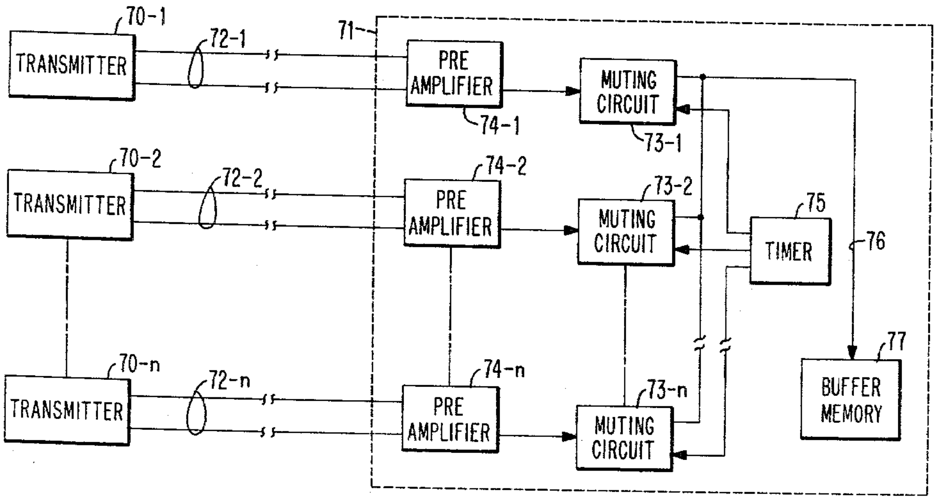

In the drawings:

FIG. 1 is a schematic diagram illustrating a preferred embodiment of the improved muting circuit and its connection with a portion of a telephone answering system; and FIG. 2 illustrates diagrammatically the application of the improved muting circuit to a data processing system in which a plurality of outlying terminal stations are connected to central office data processing apparatus.

The improved muting circuit 10 of FIG. 1 comprises a pair of complementary transistors 11 and 12. The transistor 11 includes an emitter terminal 13 connected to ground potential and base and collector terminals 14 and 15. The base terminal 14 is connected to a source of negative potential by way of a resistor 16.

The transistor 12 includes a collector terminal 17 connected directly to the collector terminal 15, an emitter terminal 18 connected to ground potential and a base terminal 19 connected to a source of positive potential by way of a resistor 20.

A transistor 25 has its collector terminal 26 connected to the base terminal 19 of the transistor 12 by way of a coupling resistor 27. The collector terminal 26 is also connected to a source of bias potential by way of a load resistor 28. The transistor 25 includes an emitter terminal 29 connected to ground potential and a base terminal 30 connected to a source of positive bias potential by way of a resistor 31 and also connected to an input terminal 32 by way of a parallel connected resistor 33 and capacitor 34. The collector terminal 26 is also connected to the base terminal 35 of a transistor 36 by way of a coupling resistor 37.

The transistor 36 includes an emitter terminal 38 connected to ground potential and a collector terminal 39 connected to a source of positive bias potential by way of a load resistor 40. The base terminal 35 of the transistor 36 is connected to the source of positive biasing potential by way of a resistor 70. The collector terminal 39 is connected to the base terminal 14 of the transistor 11 by way of a coupling resistor 41.

The collector terminals 15 and 17 are connected to the collector terminal 45 of a transistor 46 by way of a coupling capacitor 47. The collector terminal 45 is connected to ground potential by way of the winding 49 of a transformer 50 and a shunt resistor 48.

The transistor 46 includes a base terminal 51 which is connected to an input terminal 52 by way of a coupling capacitor 53. The transistor 46 also includes an emitter terminal 54 connected to a source of negative bias potential by way of series connected resistors 55 and 56. A by-pass capacitor 57 is connected between the common junction of the resistors 55 and 56 and ground potential. A voltage divider comprising a pair of resistors 58 and 59 is connected between ground potential and the source of negative potential. The base 51 is connected to the junction of these resistors to provide a suitable bias potential for Class A amplification of the signals applied to the input terminal 52.

The transformer 50 includes a second winding 63 connected by way of a transmission line 66 to a telephone subset 64, the receiver portion of which is illustrated as an impedance 65.

In the operation of the circuit of FIG. 1, alternating current signals representing recorded messages are applied to the input terminal 52. The signals applied to the terminal 52 are coupled to the base terminal 51 by the capacitor 53 for linear amplification in the collector circuit of the amplifier 46. The amplified signals are coupled to the transmission line 66 by the transformer 50 for application to the receiver portion 65 of the telephone subset 64.

During the desired time intervals when on signals are to be applied to the transmission line, the transistors 11 and 12 are rendered effective to shunt the alternating current signals to ground. This muting action is provided by means of the input signal to the terminal 32. When the signal applied to the terminal 32 is positive with respect to ground, no muting action takes place; and when the signal is negative with respect to ground, muting action takes place.

More particularly, a sufficiently negative signal is applied to the terminal 32 to operate the transistor 25 at saturation. With the transistor in saturation, ground potential appears at the collector terminal 26 and is applied to the resistor 27; and the voltage dividing resistors 20 and 27 produce a positive voltage at the base terminal 19. This positive potential forward biases the base-emitter junction of the transistor 12.

Ground potential at the collector terminal 26 is also applied to the resistor 37 to produce a positive potential at the base terminal 35 of the transistor 36. This positive potential forward biases the transistor 36 to saturation, and ground potential appears at the collector terminal 39. With ground potential at the collector terminal 39, the base-emitter junction of transistor 11 is forward biased.

As described above, the positive bias potential at the base terminal 19 and the negative bias potential at the base terminal 14 forward bias the base-emitter junction of the transistors 12 and 11. However, these bias potentials also forward bias the base-collector junctions to operate the transistors in saturation. There is no D.C. emitter current because both emitters are returned to the same (ground) potential. The circuit for the D.C. collector current extends from the positive supply potential, through resistor 20, base and collector terminals 19 and 17, collector and base terminals 15 and 14, and resistor 16 to the negative supply potential. The collector terminals are held at ground potential.

The bias circuits must provide sufficient current to the base terminals 14 and 19 to provide the A.C. collector current in response to audio signals at the signal terminal 45, while reliably maintaining the transistors 11 and 12 in saturation. This is important since momentary operation of the transistors 11 and 12 below saturation in response to peak audio signal levels would introduce transients into the telephone line 66.

The impedance of the capacitor 47 must be low relative to the impedance of the winding 49 at the input audo frequencies in order to assure complete shunting of the audio signals through the muting circuit.

Thus, any alternating current signals applied to the collector terminals 15 and 17 by the capacitor 47 are immediately shunted to ground through either the transistor 11 or the transistor 12 depending upon whether the alternating current signal at any instant in time is either negative or positive, respectively.

In this regard it is noted that, with the circuit configuration shown, it was found that the shift in potential at the collector terminals 15 and 17 when the transistors 11 and 12 are gated on is so insignificant as to assure the absence of transients at the collector terminal 45. Also, the attenuation of the signal level at the collector terminal 45 was found to be in the order of —57 db while the muting circuit is gated on. The D.C. resistance of the winding 49 of the transformer 50 is so low in comparison to the resistance values of the resistors 55 and 56 that the D.C. level of the collector 45 is effectively maintained very close to ground potential. When the muting circuit is effective the collector 45 is therefore effectively clamped close to ground potential with no transient signals appearing thereon.

When a positive signal is applied to the terminal 32, the positive potential appearing at the base terminal 30 of the transistor 25 cuts off the transistor and the negative 12 volt potential to which the collector terminal 26 is connected is applied to the reisitor 28 and the resistor 27 causing a negative potential to appear at the base terminal 19 to cut off the transistor 12. Similarly, the transistor 36 is cut off and a positive potential appears at the base terminal 14 to cut off the transistor 11. Thus with a positive signal applied to the input gating terminal 32, the muting circuit is rendered ineffective.

In order to prevent distortion of the audio signals appearing at terminal 45 when the muting circuit is rendered ineffective (i.e. clipping of the signal at both positive and negative levels), the cutoff bias potentials applied to the base terminals 14 and 19 must exceed the maximum positive and negative amplitudes of the audio signal, respectively. Otherwise, the base-collector junctions will become forward biased momentarily to distort the signal.

The emitter terminals 13 and 18 can be returned to a reference potential other than ground so long as a high impedance charge path to the same reference potential is provided for capacitor 47 at the collector terminals 15 and 17. However, this alternative is less desirable since the high impedance represents a shunt loss to the audio signal.

Typical component values which have provided reliable operation of the circuit of FIG. 1 are given by way of example below; however, these are not intended to limit the scope of the invention. The selection of other components for practicing the teachings of the present invention is well within the skill of those experienced in the art.

*Resistors*

| | | | | | |
|---|---|---|---|---|---|
| **16** | | 2.2K | **40** | ohms | 430.0 |
| **20** | | 2.0K | **48** | | 5.6K |
| **27** | ohms | 430.0 | **55** | ohms | 82.0 |
| **28** | do | 430.0 | **56** | | 1.5K |
| **31** | | 33.0K | **58** | | 22.0K |
| **33** | | 2.0K | **59** | | 18.0K |
| **37** | | 4.7K | **70** | | 10.0K |

*Capacitors*

| | | | | | |
|---|---|---|---|---|---|
| **34** | mmf | 560 | **53** | mf | 1 |
| **47** | mf | 150 | **57** | mmf | 50 |

FIG. 2 illustrates one example of the use of the improved muting circuit to well known data processing-transmission systems in which intelligence is transmitted in the form of alternating current signals of predetermined frequencies. A plurality of outlying transmitting stations 70–1 to 70–*n* are connected to central office data processing apparatus 71 by way of transmission lines 72–1 to 72–*n*.

The transmission lines are connected to respective muting circuits 73–1 to 73–*n* by way of suitable preamplifiers 74–1 to 74–*n*. A timer 75 applies gating signals to the muting circuit in desired sequence and at desired speeds. The outputs of the muting circuits are applied to the common input 76 of a buffer memory 77.

Commercially available input-output apparatus for data processing equipment operates at very low speeds relative to the switching speeds of the electronic circuits of the data processing equipment. The muting circuit of FIG. 1 can be operated at high switching speeds limited only by the turn on and turn off times of the transistors. Hence, a plurality of muting circuits can be rendered ineffective sequentially as to pass signal data whereby messages can be transmitted simultaneously from several transmitting stations for entry into the common buffer memory of a data processing machine.

More particularly, assume by way of example that the transmitters 70–1 to 70–*n* are capable of sending messages at the rate of 60 bits per second. The bits ("0" or "1") are manifested in the form of audio signals of one frequency for "0" bits and audio signals of another frequency for "1" bits. The signals applied to each transmission line are amplified by the respective preamplifier and are then applied to the input terminal 52 (FIG. 1) of the respective muting circuit.

The time duration of each data bit signal is about 16 milliseconds. Assuming that each muting circuit under the control of the timer 75 is rendered ineffective to pass signals for one-half millisecond and that the muting circuits are sequentially gated at a one kilocycle rate, several transmitters such as 70-1 can transmit messages simultaneously to the central office equipment 71.

It is readily apparent that the operation of the transmitters must be synchronized with each other and with the timer 75 to permit sequential scanning of the transmission lines as described above. The succeeding data bits written serially into the buffer memory are derived from succeeding scanned lines and must therefore be recombined in the buffer in any well known manner. For example, the bits written into memory during one complete scan cycle (one bit from each line) may be read serially into a shift register (not shown) having a stage for each transmission line; and at the end of the scan cycle they may be read out in parallel to respective shift registers corresponding to each line.

Similarly, the muting circuits can be used to transmit data from the central office to several outlying terminals simultaneously.

The use of the muting circuits to gate the signals from the transmission lines to the buffer memory as described above is particularly advantageous because they do not introduce noise or distort the data signals when they are gated on and off.

It will be appreciated that audio and video program channels may be monitored by an arrangement substantially similar to that shown in FIG. 2 with manual control of the muting circuits.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an electrical circuit having a source of signals, a source of reference potential, and an impedance connected between said sources, a muting circuit for preventing the application of signals to the impedance comprising a pair of complementary transistors each having base, emitter and collector terminals, the collector terminals being connected to each other and the emitter terminals being connected to the source of reference potential, means adapted for connection with a source of bias potential for operating the transistors simultaneously in saturation, and a low impedance capacitor connecting the junction between the source of signals and the impedance to the collector terminals for shunting signals appearing in the amplifier output circuit through the transistors.

2. In an electrical circuit having an amplifier with its output circuit connected to a source of reference potential and having a transformer with its primary winding in the output circuit, a muting circuit for preventing the application of signals to the primary winding comprising a pair of complementary transistors each having base, emitter and collector terminals, the collector terminals being connected to each other and the emitter terminals being connected to the source of reference potential, means adapted for connection with a source of bias potential for operating the transistors simultaneously in saturation, and a low impedance capacitor connecting the amplifier output circuit to the collector terminals to shunt signals appearing in the amplifier output circuit through the transistors.

3. In an electrical circuit having an amplifier with its output circuit connected to a source of reference potential and having a transformer with its primary winding in the output circuit, a muting circuit for preventing the application of signals to the primary winding comprising a pair of complementary transistors each having base, emitter and collector terminals, the collector terminals being connected to each other and the emitter terminals being connected directly to the source of reference potential, first means adapted for connection with a source of bias potential for operating the transistors simultaneously in saturation, a low impedance capacitor connecting the amplifier output circuit to the collector terminals for shunting alternating current signals appearing in the amplifier output circuit through the transistors, and signal responsive means for selectively rendering the first means effective.

4. An electrical circuit comprising an amplifier having an output terminal, a load impedance having one end connected to the terminal and its other end adapted for connection to a source of reference potential, said amplifier responsive to input signals for applying said signals to the impedance in amplified form, a pair of complementary transistors each having base, emitter and collector terminals, the collector terminals being connected directly to each other and the emitter terminals being adapted for connection directly with said reference potential, a low impedance capacitor connecting the amplifier terminal directly to the collector terminals, and means adapted for connection with a source of bias potential for operating the transistors simultaneously in saturation even when said signals are applied to the collectors, thereby shunting the latter signals through the transistors.

5. In an electrical circuit of the type in which an amplifier has its output terminal connected to a source of reference potential through a load impedance for applying signals to the load, the combination with the amplifier of a muting circuit for attenuating signals at the output terminal comprising a pair of complementary transistors each having base, emitter and collector terminals, the collector terminals being connected directly to each other and the emitter terminals being adapted for connection directly with said reference potential, a low impedance capacitor connecting the amplifier terminal directly to the collector terminals, and means adapted for connection with a source of bias potential for operating the transistors simultaneously in saturation even when said signals are applied to the collectors, thereby shunting the latter signals through the transistors.

6. A data transmission system comprising central office data processing apparatus;

a plurality of terminal stations;

transmission lines connecting respective stations to the apparatus;

a muting circuit coupled to each line for preventing transmission of data between the station and apparatus at desired intervals, each muting circuit including an amplifier having an output terminal and having an input terminal coupled to a respective transmission line, a load impedance having one end connected to the amplifier output terminal and its other end adapted for connection to a source of reference potential, said amplifier responsive to input signals from the transmission line for applying said signals to the impedance in amplified form, a pair of complementary transistors each having base, emitter and collector terminals, the collector terminals being connected directly to each other and the emitter terminals being adapted for connection with said reference potential, a low impedance capacitor connecting the amplifier terminal directly to the collector terminals, and means adapted for connection with a source of bias potential for operating the transistors simultaneously in saturation even when said signals are applied to the collectors, thereby shunting the latter signals through the transistors;

a timer; and gating means responsive to the timer for rendering the last mentioned means of the muting circuits ineffective so as to pass signals to the load impedances in a predetermined sequence.

References Cited in the file of this patent

UNITED STATES PATENTS

| | | |
|---|---|---|
| 2,960,681 | Bonn | Nov. 15, 1960 |
| 2,980,806 | Ort | Apr. 18, 1961 |
| 3,025,411 | Rumble | Mar. 13, 1962 |
| 3,048,716 | Seley et al. | Aug. 7, 1962 |